Figure 1:
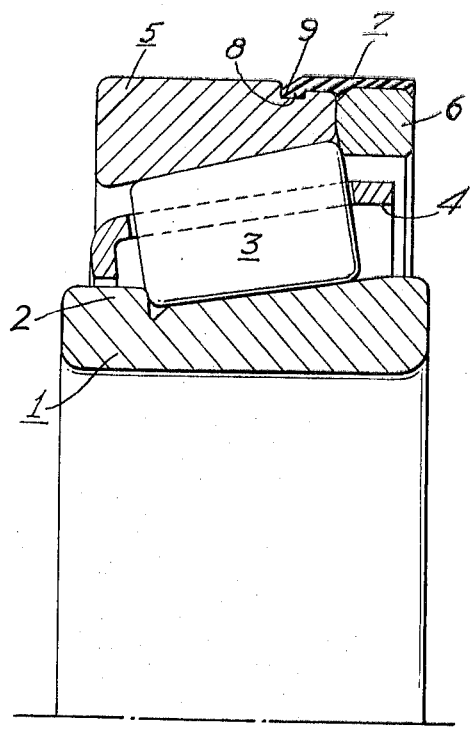

United States Patent [19]
Hallerback

[11] 3,733,109
[45] May 15, 1973

[54] ROLLING BEARING, E.G. TAPER ROLLER BEARING

[75] Inventor: Stig Lennart Hallerbäck, Vastra Forlunda, Sweden

[73] Assignee: SKF Industrial Trading and Development Company, Amsterdam, Holland

[22] Filed: May 3, 1971

[21] Appl. No.: 139,351

[30] Foreign Application Priority Data

May 8, 1970 Sweden..........................6318/70

[52] U.S. Cl..............................................308/216
[51] Int. Cl..............................................F16c 33/58
[58] Field of Search.....................308/196, 214, 212, 308/213

[56] References Cited

FOREIGN PATENTS OR APPLICATIONS 453,421  11/1949  Italy.................................308/196

Primary Examiner—Charles J. Myhre
Assistant Examiner—Frank Susko
Attorney—Howson and Howson

[57] ABSTRACT

Rolling bearing, for example a taper roller bearing of a unitized type, showing at least one separately arranged supporting flange ring for the rolling bodies, characterized thereby that a resilient element is fixed to the periphery of the supporting flange ring and that a part of the resilient element is projecting axially outside the supporting element and is at its outer part formed as a hook-shaped part projecting radially inwardly or outwardly, which part is intended to cooperate with a groove in the inner or outer periphery of the bearing race ring which groove has a section essentially corresponding to the hook part of the resilient element.

4 Claims, 2 Drawing Figures

PATENTED MAY 15 1973

3,733,109

INVENTOR:
STIG LENNART HALLERBÄCK
BY Howson & Howson
ATTYS.

ROLLING BEARING, E.G. TAPER ROLLER BEARING

The present invention relates to a rolling bearing, for example a taper roller bearing of a unitized type with at least one separately arranged supporting flange ring for the rolling elements whereby said supporting ring is connected to the bearing race ring by a ring-shaped resilient element of a specific shape, which element is fixed to one part of the supporting ring and fits into a groove in the race ring.

Rolling bearing, and especially taper roller bearings, are preferably made as units with the parts kept together, whereby the tendency of falling apart in a mounted state, which is common by conventional bearings of this kind, is avoided.

Taper roller bearings of a unitized type by which a supporting flange ring is attached to one race ring by welding, glueing or by bolt joints, whereas the other race ring is provided with a flange integral with the ring, are previously known. This kind of bearing has, however, certain disadvantages, such as for example that a welded or glued supporting ring cannot be dismounted, whereby the individual parts of the bearing cannot be exchanged if so needed, and the bearing kept together by bolt joints requires special elements, which makes the production and store-keeping more expensive. Other drawbacks with, for example welding of the supporting ring, is that the heat which occurs can cause a non-intended hardening, and by glueing the adhesive means can easily come out and cover rolls and flanges, whereby the bearing does not obtain its full operating capacity.

The bearing according to the present invention does not show the above-mentioned disadvantages. Moreover, one gains the great advantage that "rolling" of the race ring in or on the seat in a mounted position, i.e. the tendency of the race ring to rotate in or on the seat, is restricted by the resilient element mounted on the bearing. Another advantage is that the bearing seat is effectively sealed by the resilient element, so that rust will not occur between the race rings and the respective machine elements. Also, the dismounting is simplified because the element will act as a sliding surface by the dismounting of the bearing.

Figure 2:
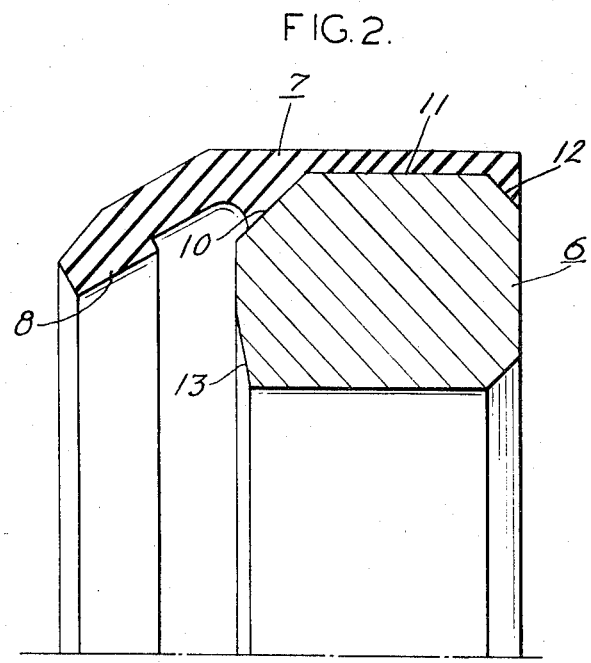

The invention will now be described in connection to a taper roller bearing according to the accompanying drawing, in which FIG. 1 shows a taper roller bearing with a supporting flange ring applied to the outer race ring of the bearing by the aid of the resilient element, and FIG. 2 shows the supporting ring with its resilient element in its dismounted state.

As mentioned above, the invention will be described in connection with a taper roller bearing, but it is not in any way limited to this type of bearing, and it will also be described in connection with the mounting of the outer race ring in a bearing seat, but according to the following claims the invention is not limited to the use of the resilient element on an outer race ring but it can also be used together with the mounting of an inner race ring on a shaft or in a combination of the two cases.

The taper roller bearing in FIG. 1 consists of an inner race ring 1 with a tapered raceway which at its side with the smaller diameter is provided with a ring-shaped flange 2 integral with the ring, which flange serves as a support for the small end of tapered rollers 3, which are inserted in a cage 4. Also the bearing has an outer ring 5 with a tapered inner raceway. A supporting flange ring 6 contacts the large end of the rollers 3 and is connected to the outer ring 5 by a ring-shaped resilient element 7 which is vulcanized to the supporting ring and provided with a part 8 shaped like a hook projecting axially outside of the supporting ring 6 and in a dismounted state radially inside of the outer envelope surface of the supporting ring. The hook-shaped part grips into a groove 9 in the outer envelope surface of the outer race ring 5 which groove has a section essentially corresponding to the part 8.

FIG. 2 shows the supporting ring 6 and the resilient element 7 before mounting on the bearing. The supporting ring 6 is provided with a bevel 10 for example with 45° angle at its outer edge facing the hook-shaped part 8 of the resilient element, a plane outer envelope surface 11 and a bevel 12 on the outer edge facing away from the hook-shaped parts. The resilient element 7 is vulcanized to the supporting ring 6 along the surfaces 10, 11 and 12, the outer envelope surface of the supporting ring thereby being wholly embedded by the element 7. The elastic element 7 consists of an annular member, preferably made of rubber, with a section which is limited by a straight line at the outer envelope surface of the element, which line is slightly longer than the maximum width of the supporting element 6, whereby the element at one side being coinciding with the supporting element, whereas it at the other side is projecting axially outside the same and thereafter turns into a part tapering inwardly, which part constitutes a hook 8, the smallest diameter of which is less than the outer diameter of the supporting element as well as the outer diameter of the race ring. The element is also provided with tapered surfaces along its inner envelope surface corresponding to the bevels 10 and 12.

The vulcanization along the bevel 10 provides that the hook-shaped part 8 is subjected to a pre-stress by the connection to the bearing, which presses the supporting ring against one side surface of the outer race ring and a bevel 13 on the supporting element against the large end of the rollers 13 along an annular zone at the opposite side of the rollers and diametrically opposite compared to the fixed flange 2.

The elastic element 7 has such a thickness that it, by its connection to the bearing, obtains such a radial oversize, that its outer envelope surface will be pressed outside of the envelope surface of the bearing outer ring, whereby a certain interference occurs by the mounting of the bearing in its seat, which means that the "rolling" of the race ring in the seal is prevented. The vulcanizing of the resilient element 7 on the bevel 12 on the supporting element 6 also entails that the risk of the supporting element to get stuck into the bearing seat at dismounting is diminished.

By the present invention a rolling bearing is obtained, the separate elements of which are kept together even in an unmounted position, is secured against "rolling" in the seat, the parts of which bearing are exchangeable and which is uncomplicated from the production as well as the mounting and dismounting points of view.

I claim:

1. Rolling bearing including at least one bearing race ring having at least one groove in its peripheral surface, for example a taper roller bearing of a unitized type including a plurality of rolling bodies, showing at least one separately arranged supporting flange ring for the rolling bodies, characterized thereby that a resilient element is fixed to the periphery of the supporting flange ring and that a part of the resilient element is projecting axially outside the supporting flange ring and is at its outer part formed as a hook-shaped part projecting axially and radially inwardly, which part is intended to cooperate with the groove in the periphery of the bearing race ring and which groove has a section essentially corresponding to the hook-shaped part of the resilient element.

2. Rolling bearing according to claim 1, characterized by that the hook-shaped part of the resilient element projecting axially outside the supporting flange ring has such a radial oversize that its diameter after the assembly of the bearing projects outside the periphery of the bearing ring.

3. Rolling bearing according to claim 1, characterized by that the resilient element is fixed to the supporting flange ring by vulcanizing.

4. Rolling bearing according to claim 1, characterized by that the supporting flange ring is provided with a bevel at its outer edge facing the bearing ring, against which bevel is fixed a part of the inner surface of the resilient element, whereby the fixation of the bevel acts as a pre-stressing of the hook-shaped part of the resilient element.

* * * * *